June 16, 1942.  W. W. GARSTANG  2,286,849
VIBRATOR FREQUENCY CHANGER
Filed July 17, 1940
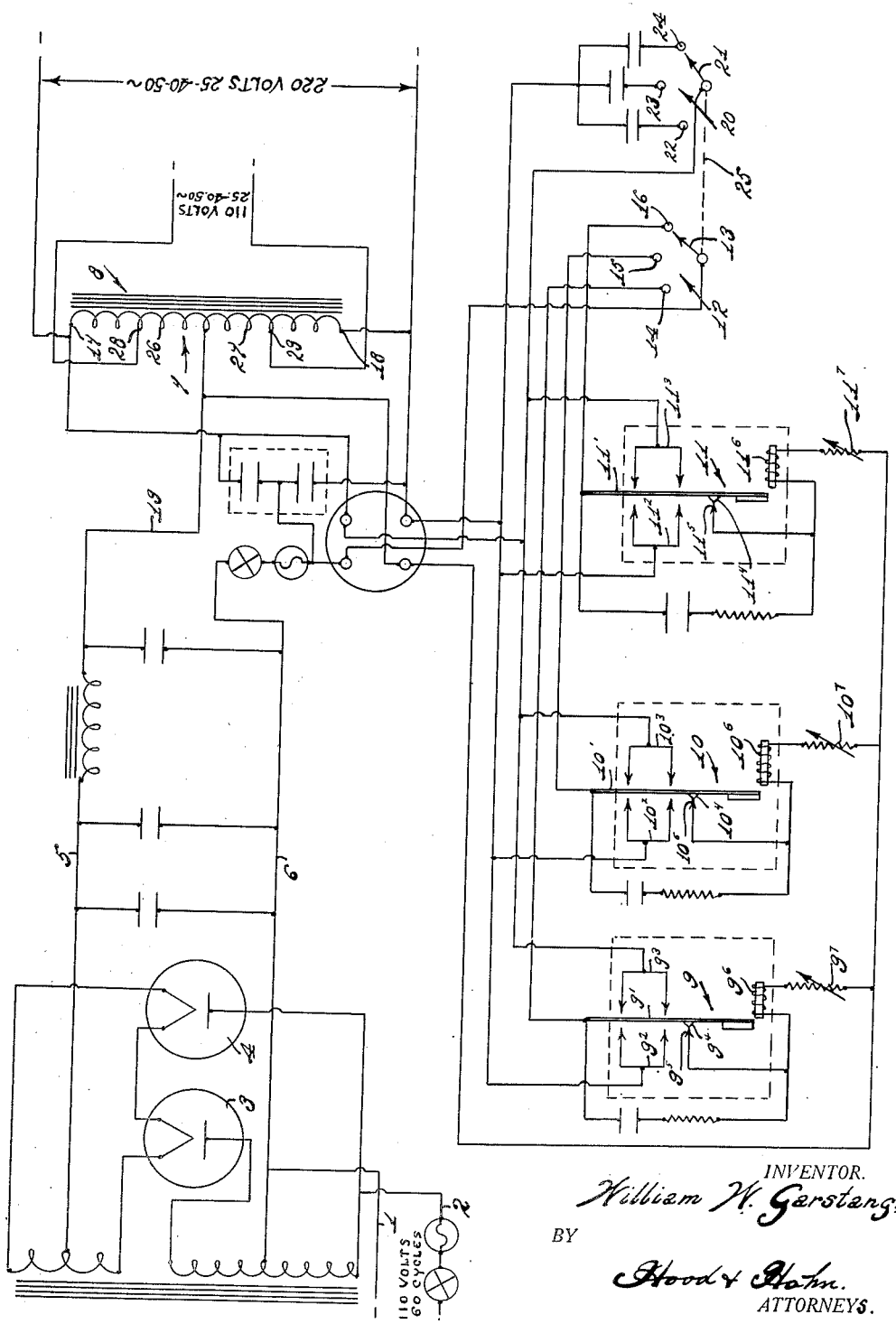
INVENTOR.
William W. Garstang,
BY
Hood & Hahn.
ATTORNEYS.

Patented June 16, 1942

2,286,849

UNITED STATES PATENT OFFICE 2,286,849

VIBRATOR FREQUENCY CHANGER

William W. Garstang, Indianapolis, Ind., assignor to Electronic Laboratories, Incorporated, Indianapolis, Ind., a corporation of Indiana Application July 17, 1940, Serial No. 346,000

3 Claims. (Cl. 171—97)

The present invention relates to improvements in vibrator systems adapted for the conversion of direct current into alternating current, or for the conversion of alternating current of one frequency or voltage to alternating current of another frequency or voltage.

More specifically, my invention relates to vibrator converting systems whereby from a source of alternating current of a given frequency through the medium of vibrator systems, there may be delivered a selected frequency alternating current different from that of the source, or, if desired, from a source of direct current there may be delivered alternating current having any one of a plurality of frequencies.

Furthermore, my invention contemplates a system wherein each of the frequencies selectively delivered may be modified or tuned to a plus or minus factor within certain limits.

For the purpose of disclosing my invention, I have illustrated in the accompanying drawing an embodiment of my invention and in said drawing, the figure is a diagrammatic view of a circuit arrangement embodying my invention.

In said drawing, I provide a suitable source of current in the supply lines 1 and 2. These supply lines, for the purpose of illustration, supply alternating current having a frequency of 60 cycles and a voltage of 110. The current from these supply lines is preferably rectified or converted to direct current through the medium of suitable tube rectifiers 3 and 4 and their associated parts to the point where lines 5 and 6 deliver direct current voltage at 110 volts. This direct current is then fed through the medium of selective vibrator circuits alternately in opposite directions to the windings 7 of a suitable auto-transformer 8.

The frequency with which the direct current is delivered in opposite directions to the winding 7 of course determines the frequency of the ultimate converted current and in order that I may selectively determine this frequency, I provide a plurality of vibrator circuits 9, 10, and 11, the vibration frequency of which are different. The vibrator circuits 9, 10, and 11 respectively include a vibrator reed 9', 10', and 11'. The respective reeds are provided with contacts adapted to engage pairs of stationary contacts $9^2$, $10^2$, and $11^2$, and $9^3$, $10^3$, and $11^3$. The reeds also carry respective contacts $9^4$, $10^4$, and $11^4$ which are initially in contact with stationary contacts $9^5$, $10^5$, and $11^5$. The reeds are operated by respective operating windings $9^6$, $10^6$, and $11^6$ of electromagnets adapted to operate their respective reeds and cause the same to vibrate.

The frequency of the reeds of the respective vibrator circuits 9, 10 and 11 is different and, for the purpose of illustration, the frequency of the reed of the vibrator circuit 9 will be 25 cycles; the frequency of the vibrator reed 10' will be 40 cycles; and the frequency of the vibrator reed 11' will be 50 cycles. This frequency, of course, is determined by the normal vibratory frequency of the reed itself plus any variable in the operating circuit of the operating windings which may be adjusted through suitable resistances $9^7$, $10^7$, and $11^7$. These resistances may be varied to modify the vibration rate slightly plus or minus for the purpose of adjustment or control. The reeds may be selectively connected to one side 6 of the line through the instrumentality of a selective switch 12, the movable arm 13 of which is connected to one side 6 of the direct current supply and is adapted to make selective contacts with one of three stationary contacts 14, 15, or 16. The contact 14 is connected to the reed 9'; the contact 15 is connected to the reed 10'; and the contact 16 is connected to the reed 11', so that dependent upon the position of the arm 13, the reed of a selected vibrator circuit may thus be connected to the side 6 of the supply line. One pair $9^3$, $10^3$, and $11^3$ of the stationary contact is connected to the outer terminal 17 of the winding 7. The opposite pair $9^2$, $10^2$, and $11^2$, are connected to the opposite end terminal 18 of the winding 7, while the winding 7 has a center tap 19 connecting it with the opposite side 5 of the line.

A second switch 20 having a movable switch arm 21 and stationary contacts 22, 23, and 24, is adapted to connect suitable capacitors with the winding 7, in accordance with the vibrator circuit selectively connected through the medium of the switch 12, the switch arms 13 and 21 being adapted to move in unison by suitable mechanical connections 25.

In operation, assuming that it is desired to convert the 110 voltage 60 cycle current from the initial supply line to 110 volt 25 cycles for delivery the switch arm 13 would be moved to contact the stationary contact 14. Therefore, the vibrator circuit 9 would be connected to the supply lines 5 and 6. Current flowing through the operating magnet $9^6$ would attract the reed 9' to the contacts $9^3$, thereby causing current to flow in one direction through the section 26 of the winding 7. As soon as the reed 9' is attracted by its energizing winding $9^6$, circuit is broken between the contacts 9⁴ and 9⁵ thereby breaking the circuit of the energizing winding and permitting the reed to move in the opposite direction until the contacts thereon engage stationary contacts 9² thereby closing the circuit through the section 27 of the winding 7, in the opposite direction however, back to the supply line 5. Due to the fact that the normal vibration frequency of the reed 9' is 25 cycles, the current, therefore, delivered by the auto-transformer 8 will have been converted from 110 volt direct current to 110 volt alternating current at 25 cycles.

If, however, it is desired to deliver say 110 volts at 40 cycles, the switch arm 13 will be moved into contact with the stationary contact 15 thus connecting the vibrating circuit 10 with the terminals of the auto-transformer in the same manner as the vibrator circuit 9, with the exception, however, that the normal vibration period of the reed 10' is 40' cycles and, therefore, the frequency of the delivered current will be modified to 40 cycles.

Likewise, the frequency may be changed to 50 cycles by moving the switch arm 13 to the stationary contact 16. In each instance, however, if it is desired, the normal frequency may be slightly modified either plus or minus by adjusting the resistances 9⁷, 10⁷, or 11⁷ to slightly vary the frequency of the controlled reed so that a plus or minus change of frequency of 2 cycles may be obtained. This is particularly advantageous where it is desired to tune the load circuit to a particular load.

It is also to be observed that for the delivery of 110 volts, the auto-transformer windings are tapped at an intermediate point as at 28 and 29. If it be desired to deliver say 220 volts in the same manner, the load circuit would be taken from the end terminals 17 and 18 of the winding.

It is, therefore, apparent from the above, that I am enabled to convert a normal supply circuit of a predetermined frequency to a load circuit of a different and selected frequency or, if desired, I am enabled to convert a direct current supply to an alternating current supply of any predetermined selected frequency. It will be further noted that I am enabled to, in addition to selecting the frequency, modify the selected frequency, within certain predetermined limits, to tune this selected frequency with a predetermined load, if so desired.

I claim as my invention:

1. An electric system for selectively converting a direct current into an alternating current having any one of a plurality of frequencies including a single transformer having an input winding, a source of direct current, a plurality of vibrating interrupters, each including a resilient reed, the natural vibrating frequency of each reed being different and an electromagnet for inducing vibrations in the reed, the vibrations so induced being different from the vibrations induced by any of the other magnets upon their respective reeds and stationary contacts alternately engaged by said reeds, selective means for connecting the windings and reed of any one of said switches with said direct current source and simultaneously operated selective means for connecting the stationary contacts of said reed with the input windings of said transformer.

2. An electric system for selectively converting a direct current into an alternating current having any one of a plurality of frequencies including a single transformer having an input winding, a source of direct current, a plurality of vibrating interrupters, each including a resilient reed, the natural frequency of each reed being different, and an electromagnet for inducing vibrations in the reed, the vibrations so induced being different from the vibrations induced by any of the other magnets upon their respective reeds, and stationary contacts alternately engaged by said reed, selective means for connecting the energizing windings and the reeds of each interrupter with said direct current source, and simultaneously operated selective means for connecting the stationary contacts of said reed with the input windings of said transformer, said energizing windings of each interrupter, when connected to the source of direct current being in a circuit independent of the transformer energizing circuit.

3. An electric system for selectively converting a direct current into an alternating current having any one of a plurality of frequencies including a single transformer having an input winding, a source of direct current, a plurality of vibrating interrupters, each including a resilient reed, the natural frequency of each reed being different, and an electromagnet for inducing vibrations in the reed, the vibrations so induced being different from the vibrations induced by any of the other magnets upon their respective reeds, and stationary contacts alternately engaged by said reed, selective means for connecting the energizing winding and reed of any one of said interrupters with said direct current source, simultaneously operated selective means for connecting the stationary contacts of said reed with the input windings of said transformer, and means for modifying the energy supplied to said energizing winding, and individual means for modifying the energy supplied to each energizing winding for modifying the vibration frequency of the reed actuated thereby.

WILLIAM W. GARSTANG.